April 15, 1941. J. B. FULLERTON 2,238,044
DISHWASHER
Filed Nov. 16, 1936 6 Sheets-Sheet 2
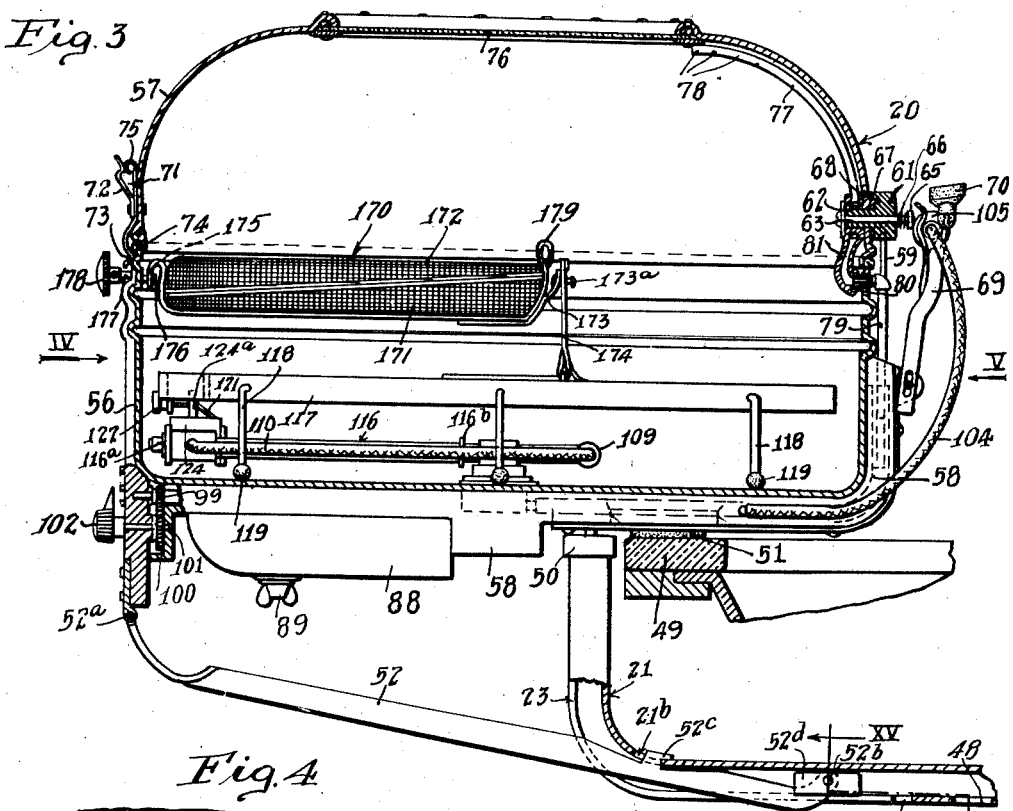
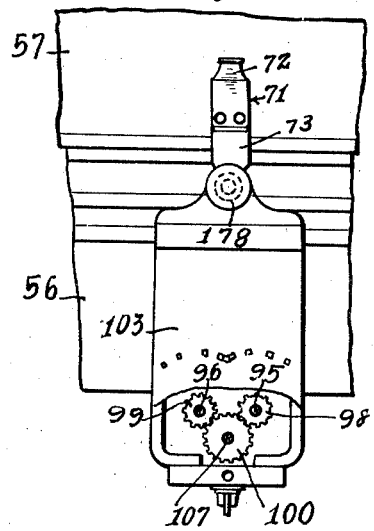
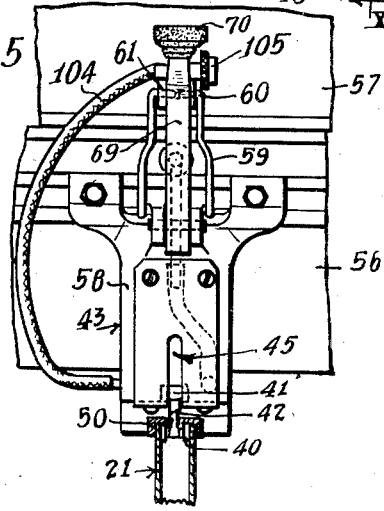
Inventor
BY James B. Fullerton
Lyon & Lyon ATTORNEYS

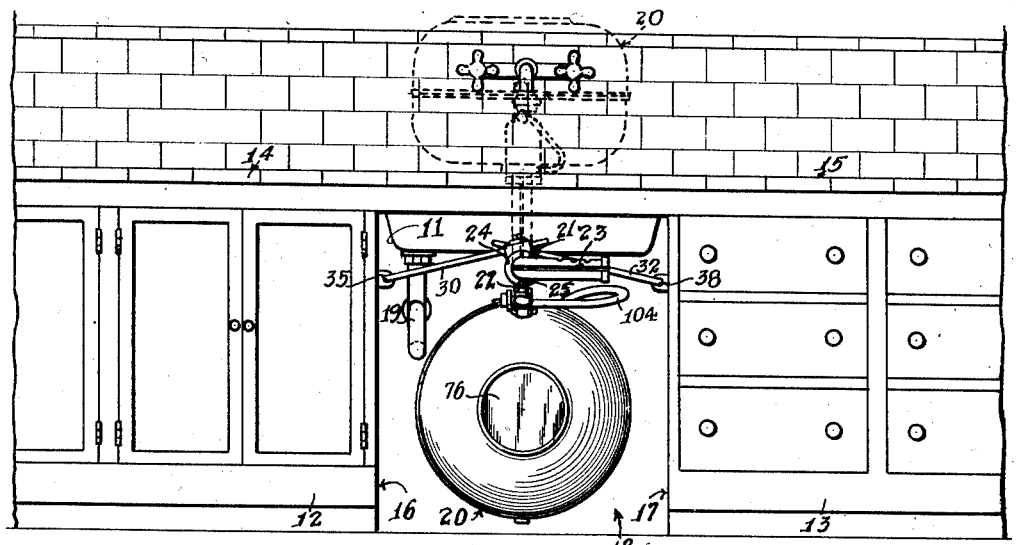
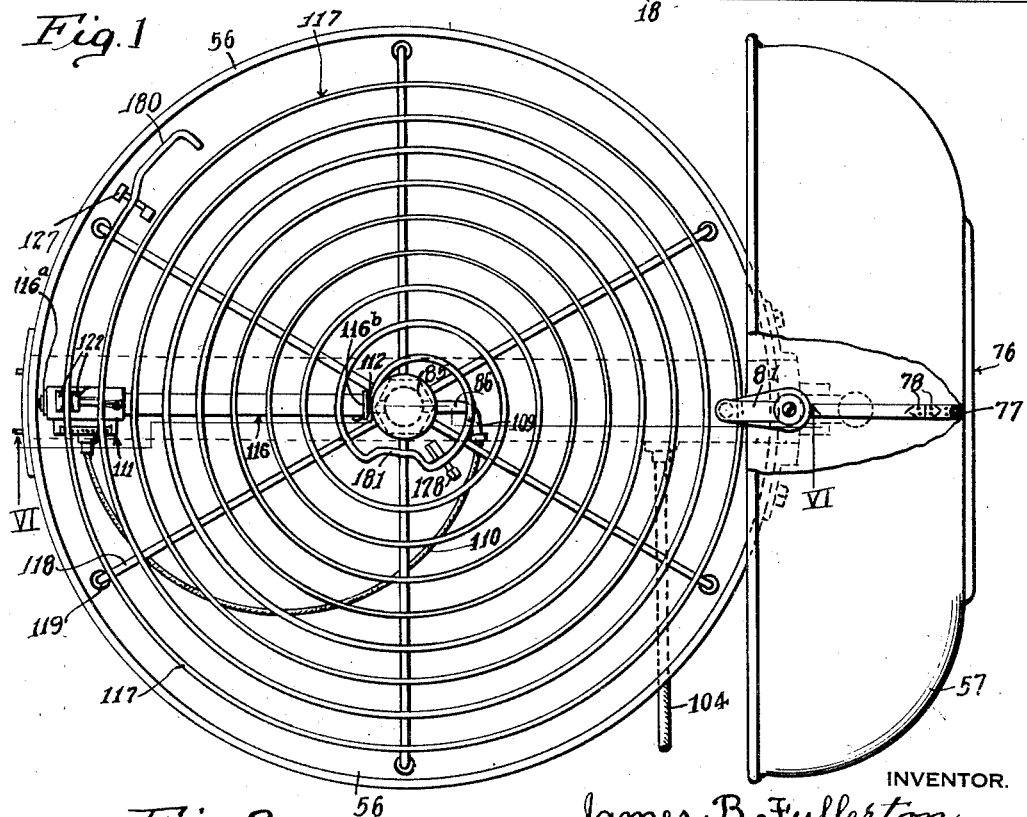

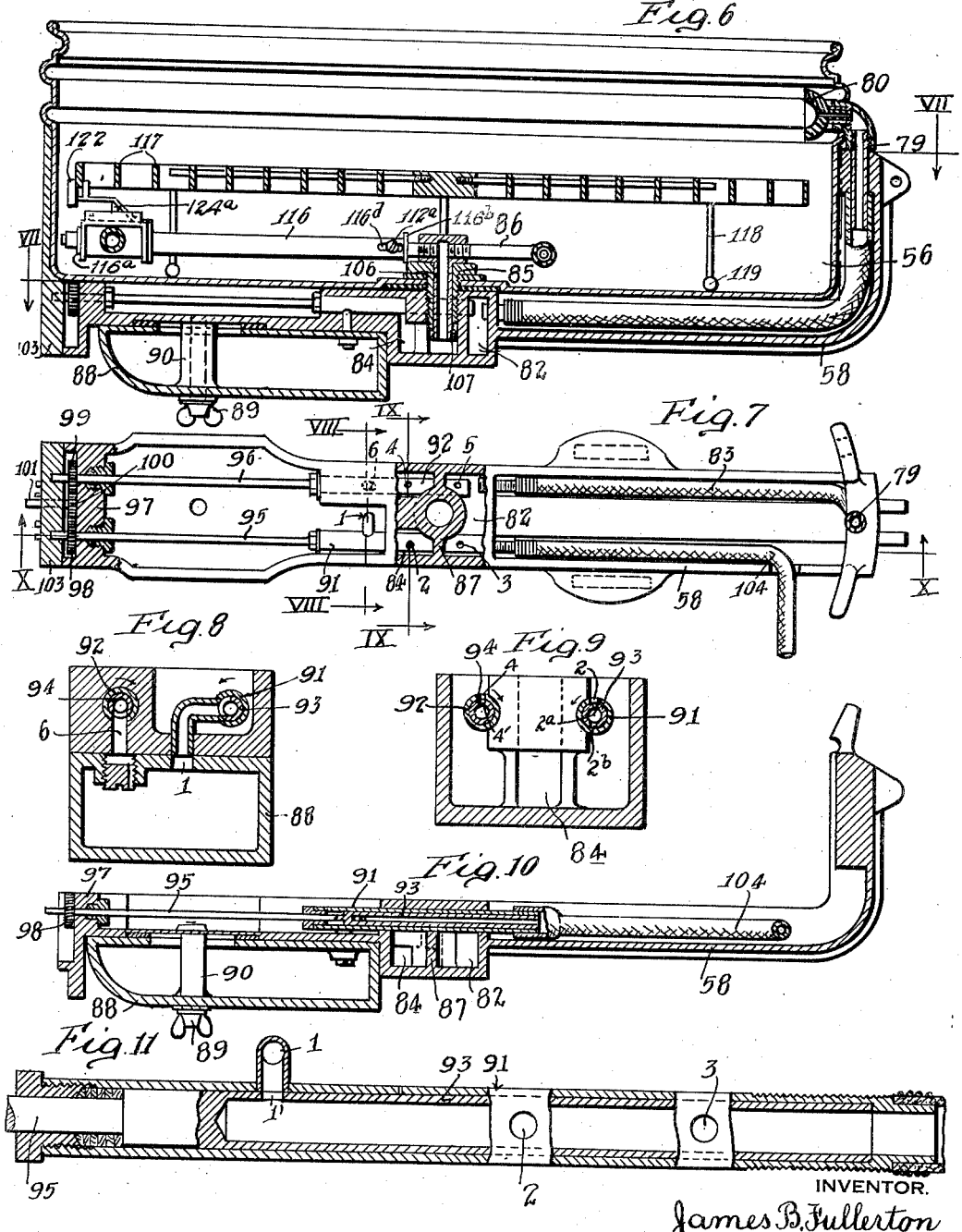

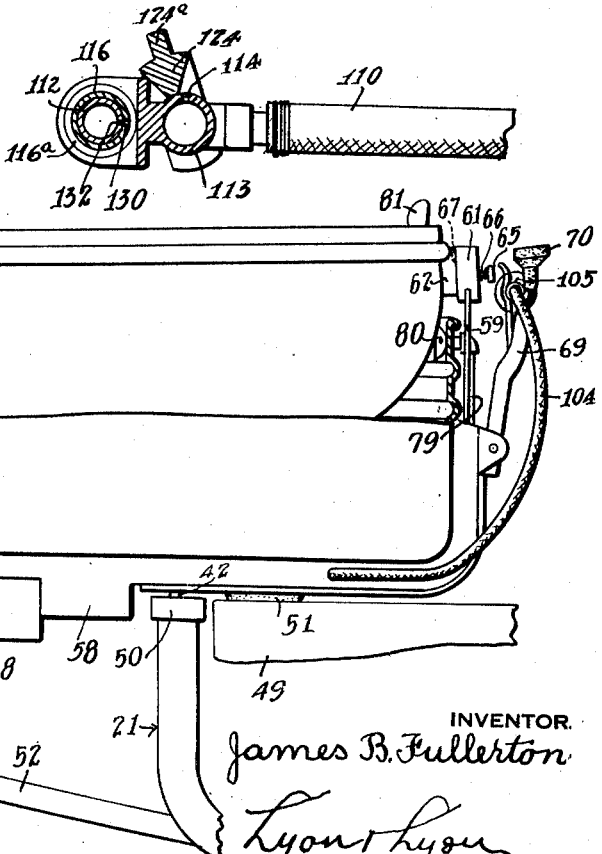

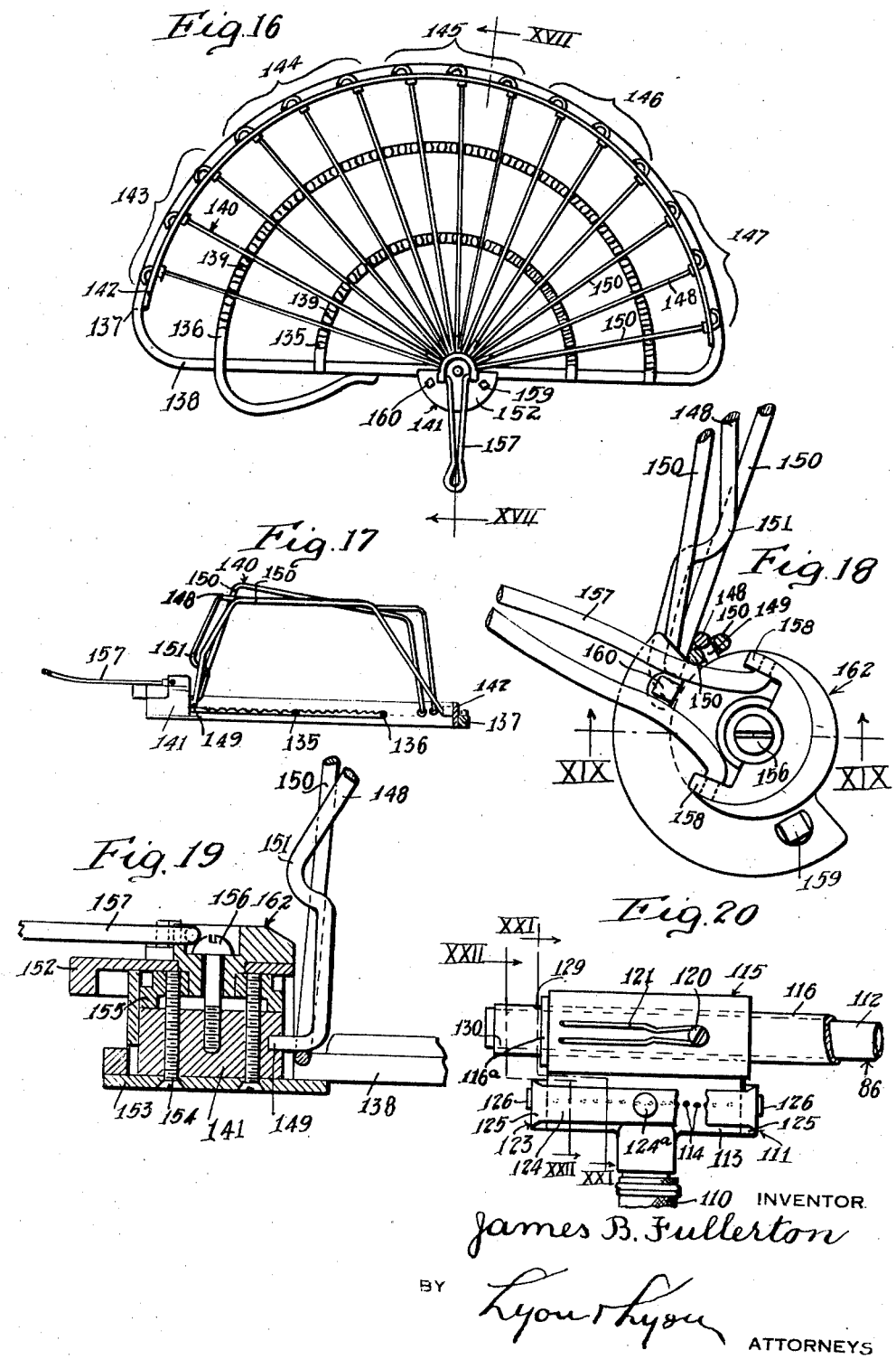

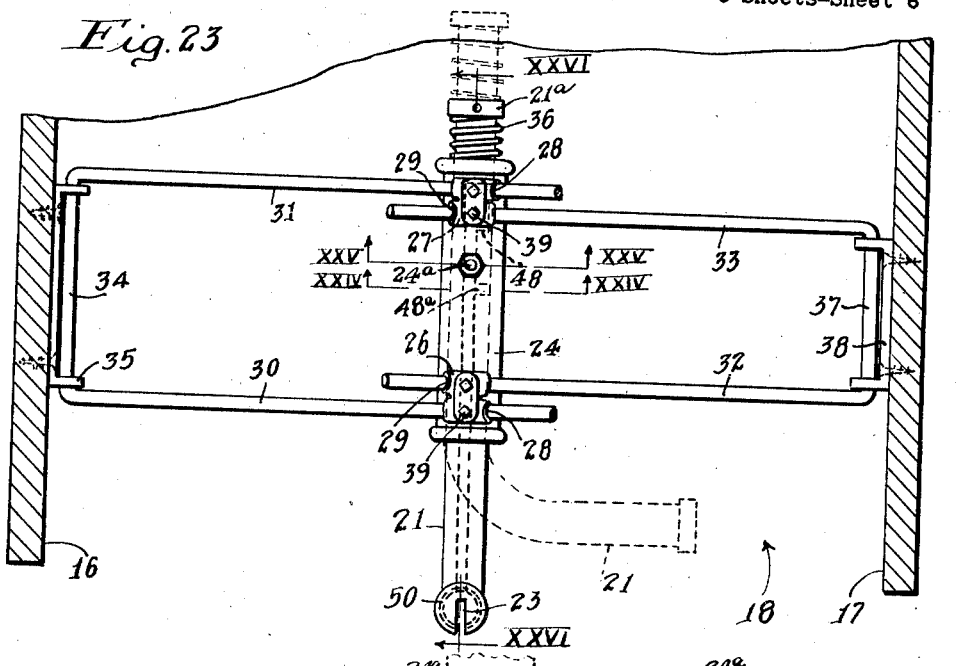
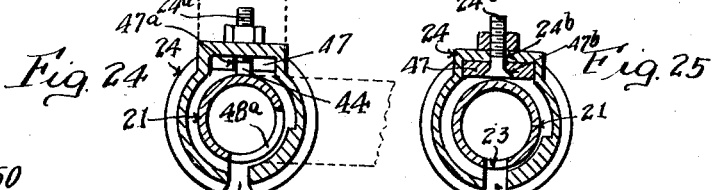
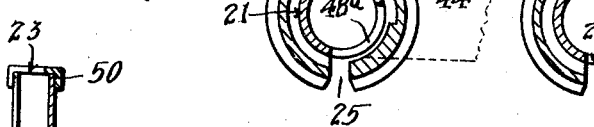
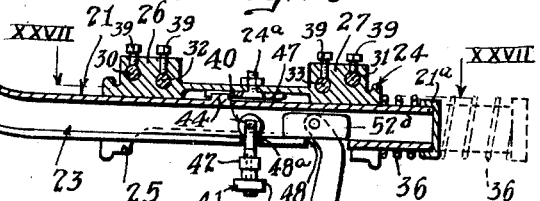
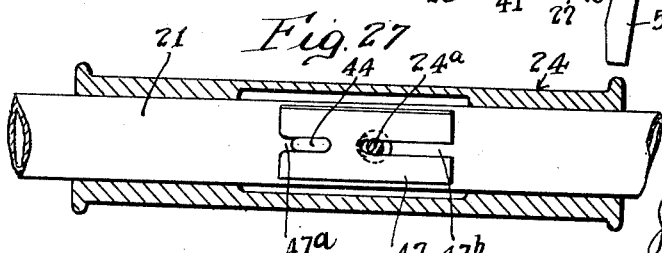

Patented Apr. 15, 1941

2,238,044

UNITED STATES PATENT OFFICE 2,238,044

DISHWASHER

James B. Fullerton, Los Angeles, Calif.

Application November 16, 1936, Serial No. 111,054

14 Claims. (Cl. 141—9)

This invention relates to washing machines for washing articles such as dishes as distinct from clothes washing machines and has to do particularly with machines for domestic use.

One object of the invention is to provide a portable washing machine that can be installed on a standard kitchen sink and readily moved between an operative position above the sink and a storage position in the recess below the sink when it is not in use.

Another object is to provide a washing machine having an enclosure consisting of a lower container and a cover therefor which is adapted to nest within the lower container when the device is not in use.

Another object is to provide a washer consisting of a lower receptacle and a removable cover therefor with a spray in the cover, in which opening and closing movement of the cover automatically makes and breaks the water connection to the spray in the cover.

Another object is to provide a dish washing machine having an upwardly directed spray nozzle in the lower part thereof in which the water from the spray is returned by the cover of the machine in such manner as to have a second useful cleaning effect on the dishes.

Another object is to provide a dish washer of the spray cleansing type which can be readily controlled to direct either soapy or clear water onto the dishes either from below or above.

Another object is to provide a dish washer of the spray cleansing type that requires only a small flow of water for efficient operation.

Another object is to provide a dish washing machine having a collapsible rack for supporting dishes, saucers and the like, which rack is capable of supporting the plates only when the plates are properly positioned in the rack for effecting washing action.

Various more specific objects and features of the invention will appear from the detailed description which follows.

In the drawings:

Fig. 1 is a front elevation view showing a dishwasher in accordance with my invention installed on a kitchen sink;

Fig. 2 is a plan view of my washer with the cover in raised or open position, the dish racks being removed;

Fig. 3 is a sectional view through the casing of the dishwasher shown in position for use mounted on the rim of a sink, the interior elements of the machine being shown in elevation;

Fig. 4 is a detail elevational view of a portion of the front of my machine with a portion of the casing broken away to show the gears for controlling the valves, the view being taken in the direction of the arrow IV in Fig. 3;

Fig. 5 is a detail rear elevation view of the hinge portion of my machine, the view being taken in the direction of the arrow V in Fig. 3;

Fig. 6 is a sectional view through the lower portion of my washing machine showing the spray mechanism and the water supply conduits and valves and the soap receptacle, the dish rack being removed. The section is taken in the line VI—VI of Fig. 2;

Fig. 7 is a horizontal sectional view taken along the line VII—VII of Fig. 6, and showing the details of construction of the valve mechanism;

Fig. 8 is a detail cross section taken along the line VIII—VIII of Fig. 7;

Fig. 9 is a detail cross section taken along the line IX—IX of Fig. 7;

Fig. 10 is a detail longitudinal section taken along the line X—X of Fig. 7;

Fig. 11 is a horizontal longitudinal sectional view through one of the valve elements.

Figs. 12, 13, and 14 are schematic diagrams showing the relative position of the valve elements of the washer, looking toward the rear of the machine.

Fig. 15 is a detail section taken in the plane XV—XV of Fig. 3.

Fig. 16 is a plan view of the plate rack of the machine shown in position for use.

Fig. 17 is a detail view of the plate rack taken in the plane XVII—XVII of Fig. 16.

Fig. 18 is a detail plan view of the center or hub section of the plate rack shown in Fig. 16.

Fig. 19 is a detail sectional view through the hub mechanism of the plate rack, the section being taken in the plane XIX—XIX of Fig. 18.

Fig. 20 is a detail plan view of a portion of the spray mechanism of my washer.

Figs. 21 and 22 are detail sectional views illustrating the operation of the spray mechanism, these sections being taken along the lines XXI—XXI and XVII—XVII in Fig. 20.

Fig. 23 is a detail plan view of the track and track supporting elements.

Figs. 24 and 25 are detail cross-sections taken in the planes XXIV—XXIV and XXV—XXV of Fig. 23.

Fig. 26 is a longitudinal section through the track, taken in the plane XXVI—XXVI of Fig. 23.

Fig. 27 is a detail section taken in the plane XXVII—XXVII of Fig. 26.

Fig. 28 is a side elevation of the machine with the cover in nested position, a portion of the wall of the lower receptacle being broken away.

Dishwashing machines, if they are to have any appreciable capacity, must be fairly bulky when set up for use. Therefore it often becomes a problem to place such washing machines, particularly in small kitchens and kitchenettes such as are common today. However, most kitchens are provided with sinks having recesses therebelow and in accordance with the present invention I utilize this space or recess below a sink for storage of a dishwasher by employing a special mechanism whereby the washer can be readily transferred into a position above the rim of the sink for use.

Referring to Fig. 1, there is shown a sink 11 mounted between cabinets 12 and 13, respectively, with drain boards 14 and 15, respectively, positioned above the cabinets 12 and 13. End walls 16 and 17, respectively, of the cabinets 12 and 13 define the side walls of a recess 18 below the sink 11, this recess having a depth fore and aft equal to the fore and aft depth of the sink and the cabinet. Except for a drain pipe 19 for the sink, this recess 18 is normally clear and may be used as a storage space for a dishwasher. The dishwasher, designated generally by the reference numeral 20, is shown in full lines positioned in this recess 18 and shown in dotted lines in position for use above the rim of the sink.

To support the washer receptacle 20 in either of the two positions shown in Fig. 1 and permit ready transfer of the receptacle from either position to the other, a track 21 is provided, to which the receptacle 20 is movably attached by a carriage 22. Thus referring to Fig. 26, the track 21 consists of an L-shaped tubular member having a long straight arm and a short straight arm interconnected by a gradually curved section. A slot 23 extends longitudinally from one end of the tubular member to the other on the exterior side (the expression "exterior" being used with reference to the "curved portion."

To support the track 21, the long arm thereof is slidably and rotatably mounted in a horizontal sleeve 24, the sleeve having its lower mid portion cut away and having slots 25 at the ends thereof which align with the slot 23 in the track when the latter is positioned with the short arm extending upwardly. The sleeve 24 is adapted to be supported in fixed position within the recess 18 immediately below the bottom of the sink 11. To this end, the sleeve 24 is provided with bracket members 26 and 27 at opposite ends thereof, each bracket having apertures 28 and 29 extending therethrough for receiving supporting rods 30 and 31, and 32 and 33, respectively. The apertures 28 receive the rods 30 and 31 and the apertures 29 receive the rods 32 and 33. Rods 30 and 31 extend outwardly and downwardly to the left and are joined at their outer ends by an integral cross member 34, which is hingedly supported in a bracket 35 adapted to be screwed to the recess wall 16. The rods 32 and 33 extend downwardly and outwardly to the right from the sleeve 24 and are connected at their outer ends by an integral cross member 37, in turn hingedly supported on a bracket 38 adapted to be screwed or otherwise secured to the recess wall 17. The rods 30 and 31, 32 and 33 are slidably mounted in their associated apertures 28—28 and 29—29 so that the rods can be moved inwardly and outwardly with respect to each other and with respect to the sleeve 24 to accommodate recesses of different widths. When properly adjusted for any particular recess the rods are locked in the apertures 29—29 and 28—28 by set screws 39. By virtue of their downward and outward inclination, the rods 30, 31, 32 and 33 are capable of supporting substantial weight since any downward force on the sleeve 24 tends to press the plates 35 and 38 outwardly against the walls 16 and 17 of the recess. As shown in Fig. 1, the track is positioned midway between the side walls 16 and 17 of the recess. However, this is not essential and the sleeve 24 may be moved off center along the rods 30, 31, 32 and 33 (by loosening the set screws 39) if necessary to avoid interference with the drain pipe 19 of the sink.

The long arm of the track 21 is slidable longitudinally within the sleeve 24 and is also rotatable therewithin through an angle of 90°. When the washing machine is in position for use above the rim of the sink the track is positioned forwardly with the short arm extending vertically to bring its upper end closely adjacent the rim of the sink. When the washing machine is in storage position in the recess below the sink the track 21 can be rotated through 90° to bring the short arm to horizontal and then moved rearwardly to place it below the sink out of the way. The track is constantly urged into rearward position by a helical spring 36 surrounding the rear end of the long arm of track 21 which projects beyond the rear end of the supporting sleeve 24, this spring being compressed between a shoulder 21a on the rear end of the track and the rear end of the sleeve 24.

To retain the track in forward position with the short arm extending vertically, a tongue 44 (Figs. 26 and 27) is provided on the track which is adapted to engage in a slot 47a in a plate 47 secured within the sleeve 24. The track may be moved from the storage position by pulling it forwardly against the tension of the spring 36, the tongue 44 being clear of the plate 47 in this position of the track, then rotating the track one-quarter turn to the left, and then releasing the track to permit the spring 36 to pull the track rearwardly and cause the tongue 44 to engage in the slot 47a. To move the track into storage position, the procedure is reversed. The working position of the track may be adjusted by shifting the plate 47 forwardly or rearwardly within the sleeve 24, the plate being retained in position by a bolt 24a extending through an aperture 24b in the wall of the sleeve and a slot 47b in the plate 47.

The carriage heretofore designated by the general reference numeral 22, really consists of two carriages 40 and 41, respectively, interconnected by a swivel neck 42. The carriage 40 consists of a pair of spaced apart wheels or rollers which roll along on the inside surface of the tubular track member on each side of the slot 23. The other carriage 41 cooperates with a track 43 (Fig. 5) on the washing receptacle, this track consisting of a plate having a slot 45 therein, which plate is secured to a casting 58 on the lower receptacle of the washer. The casting is recessed above the slot 45 in plate 43 to accommodate the carriage 41.

The rear end of the slot 23 in track 21 connects with an arcuate slot 46a extending a quarter way around the track, and at a short distance from its rear end slot 23 communicates with another arcuate slot 48 also extending a quarter way around the track. These slots are for the entry of the swivel neck 42 interconnecting the carriages 40 and 41 and a brace 52 (to be described later) when the track is rotated through 90° to permit its movement into retracted position within the sink recess.

Assuming that the washer is in storage position and it is desired to move it into operating position, the following operations are performed:

First, the operator grasps the short arm of track 21 and pulls the track forwardly against the tension of the spring 36 to its limit of motion, then rotates the track a quarter revolution to bring the short arm into vertical position in front of the sink rim 49. At the beginning of this operation the swivel neck 42 is in the arcuate slot 48a, the brace 52 is in the arcuate slot 48, and the entire washer is carried forwardly with the track. However, when the track is rotated to bring the short arm thereof into vertical position, the weight of the washer causes the swivel neck 42 and the brace 52 to move around through the arcuate slot 48a and 48, respectively, into the end of the longitudinal slot 23. The next operation by the operator is to grasp the washer 20 and pull it forwardly and upwardly, the carriage 40 sliding along the interior of the track 21 and the swivel neck 42 sliding along the longitudinal slot 23. This movement is continued until the carriage 40 reaches the extreme upper end of the track 21 and is stopped by the end cap 50 on the short arm of the track. However, the longitudinal slot 23 is continued into the end cap 50 so that the swivel neck 42 can project directly thereabove. The entire washer is then moved rearwardly above the sink rim, this movement being possible by virtue of the carriage 41 being slidably mounted on the track 43 on the receptacle. This rearward motion of the washer is continued until the swivel neck 42 reaches the forward end of the slot 45 in track 43, which brings a supporting pad 51 on the washer directly above the front rim 49 of the sink. However, the washer will not of itself retain this position because the center of gravity of the machine is positioned forwardly of the upper end of the track. To firmly support the washer in the upper position, the brace 52 is provided on the washer, which brace consists of an elongated piece of strip metal hingedly attached at its forward end by a hinge 52a to the front lower edge of the washer receptacle 56, and extending at its rear end through the slot 23 into the track 21. A plate 52d, pivotally secured by a pin 52b to the rear end of brace 52, prevents escape of the said rear end from track 21. A short distance from the rear end of brace 52 the upper edge of the brace is shaped to define a hook 52c adapted, when the washer is in operating position as shown in Fig. 3, to hook over the rear edge of a short slot 21b in the upper side of track 21 and thereby prevent downward and rearward movement of the front end of the washer. After the washer has been lifted into operating position in the manner already described, the brace 52 is pressed upwardly to cause the hook 52c to enter slot 21b and then the washer is released, whereupon the weight of the forward position of the washer is transferred through the brace 52 to the track 21. To restore the washer to storage position, it is merely necessary to press downwardly on the brace 52, while lifting the front end of the washer, to release hook 52c, then tilt the washer forwardly and downwardly while pulling it forwardly to carry the carriage 41 to the rear end of the track 43 on the receptacle and then lower the washer downwardly and rearwardly, the carriage 40 and the plate 52d sliding into rear position in the track 21, after which the track 21 is rotated through 90° and moved into rearward position in the manner previously described. The plate 52d is made longer than the slot 48 so as to bridge the latter, as shown in Fig. 26. When the washer is in operation position, the plate 52d lies to one side of the slot 23, as shown in Fig. 15.

*General construction of washer*

The washer unit, heretofore designated generally by the reference numeral 20, consists of a lower receptacle 56 and a hinged cover 57. The lower receptacle 56 is substantially cylindrical in shape and is secured to and supported upon the casting 58 which carries the track 43 and the pad 51. The casting 58 extends upwardly along the rear side of the receptacle 56 (when the washer is in position for use) and has extending from its upper end a U-shaped member 59, the cross portion 60 of which functions as a hinge pin, and rotatably supports a swivel member 61 which is rotatably attached to the cover 57. This swivel member 61 abuts against a swivel member 62 anchored to the cover 57 and the two swivel members are held in alignment by a shaft 63 extending therethrough and exteriorly beyond the swivel member 61. The shaft 63 is provided with a head on its inner end which presses against the cover swivel member 62 and the outer end of shaft 63 is provided with a head 65 which compresses a helical spring 66 surrounding the projecting portion of shaft 63 against the swivel member 61, thereby holding the swivel members 61 and 62 against each other. To yieldably retain the swivel members in either of two diametrically opposite positions with respect to each other, the swivel member 61 is provided with a tongue 67 which normally engages a groove 68 in the swivel member 62. Tongue 67 and groove 68 are so oriented relative to each other that they engage when the cover is in closed position as shown in Fig. 3 or completely reversed as shown in Fig. 28. Reversal of the cover is provided for to reduce the bulk of the container when it is in storage position. Thus it will be observed that a substantial portion of the cover 57 lies above the plane of the swivel members 61 and 62 (Fig. 3) so that by reversing the cover and nesting the upper portion of the cover within the receptacle 56 the dimensions of the washer can be substantially reduced.

To open the cover it is simply lifted up at the forward end, thereby causing the swivel block 61 to rotate about the cross portion 60 of the U-shaped supporting member 59. To support the cover in open position, as shown in Fig. 2, a rest arm 69 is extended upwardly from the casting 58 back of the swivel member 61 and provided with a pad 70 for contacting the rear upper portion of the cover.

To releasably latch the cover 57 in closed position, either in the washing position shown in Fig. 3 or the nested position shown in Fig. 28, spring latch members 71 and 72 are riveted to the cover 57 adjacent the edges thereof and diametrically opposite the swivel member 61. When the cover 57 is closed in washing position as shown in Fig. 3, the inwardly bent end 73 of the spring member 71 hooks over a bead 74 on the upper rim of the receptacle 56. When the cover 57 is in nested position as shown in Fig.

28, the curved end 75 of spring 71 slips inside of the bead 74 and the end of the clip 72 slips over the outside of the bead 74.

To permit observation of the washing operation within the machine, the cover 57 is preferably provided with a central window 76 of transparent material.

Dishes to be washed are positioned in suitable racks within the receptacle 56 and washed by directing sprays of water thereon from a lower spray to be described in detail later and an upper spray in the cover 57. This upper spray consists of a conduit secured within the cover 57 and extending upwardly from a point below the swivel connection 62 to a point adjacent the window 76 where jet openings 78 are provided for discharging the water. Control valves and conduits for supplying water under pressure are provided within the casting 58 and will be described in detail later.

To conduct water from these conduits to the cover conduit 77, a pipe 79 is provided extending from the conduit within casting 58 upwardly to a point below the swivel member 61 where it extends through the wall of the receptacle 56 and terminates in a rubber socket 80 (Fig. 6), which socket is adapted to receive and be pressed in water-tight connection with a connecting member 81 on the lower end of the cover conduit 77 when the cover 57 is in the closed position shown in Fig. 3. This water connection is automatically made when the cover is closed and broken when the cover is opened. One of the chief reasons for providing the tongue 67 and the groove 68 on the swivel members 61 and 62 is to facilitate proper alignment of the cover 57 with respect to the receptacle 56 before it is lowered into closed position so as to insure registration of the connecting member 81 with the receptacle 80.

The lower spray mechanism positioned in the receptacle 56, which will be described in detail later, directs a spray of water upwardly through the dishes. A goodly portion of the water admitted by the lower spray will pass through the dishes without touching them or will be only slightly deflected by the dishes and will impinge upon the inner surface of the cover 57 and fall back upon the dishes. It is desirable to utilize this partly spent water for washing purposes to as great an extent as possible and for this reason the cover 57 is of dome shape as shown in Fig. 3. As a result of this dome shape, upwardly directed water impinging upon the portions of the cover adjacent the outer edge is directed inwardly to fall back upon the dishes positioned near the center of the receptacle. This is desirable because the lower spray mechanism employed is preferably of the rotating type which washes more effectively through the outer portions of the container than at the center.

*Water supply and control mechanism*

As already indicated, the upper or cover spray is supplied with water through the pipe 79 which extends out of the casting 58. This pipe and also the lower spray mechanism are supplied with water under pressure from any suitable source such as the faucet associated with the sink on which the washer is mounted through a valve mechanism now to be described. A soap container is also provided and the valve is so arranged as to permit water from the pressure supply to be selectively admitted either directly to the lower spray, indirectly through the soap receptacle to the lower spray, directly to the upper spray or indirectly through the soap receptacle to the upper spray. The casting 58 previously mentioned as the supporting member for the lower receptacle 56 also defines elements of the water control and distribution system.

Thus referring to Figs. 6 and 7, the casting 58 defines a chamber 82 directly connected through a hose 83 to the pipe 79 which supplies water to the upper spray, and a chamber 84 connecting with a hollow rotatable hub member 85 which supports and supplies water to a rotatable arm 86 constituting a part of the lower spray mechanism. The chamber 82 is separated from the chamber 84 by a partition wall 87. There is positioned against the lower front portion of the casting 58 a soap receptacle 88 which is held in sealing engagement with casting 58 by a wing head bolt 89. A hollow neck 90 is formed integrally with the soap receptacle 88 and serves as a guide for the bolt 89 and prevents leakage of liquids from the soap receptacle when the latter is removed from the casting 58.

Positioned within the casting 58 and extending through the chambers 82 and 84 to a point above the soap container 88 are two valve sleeves 91 and 92, respectively, within which are mounted rotatable valve tubes 93 and 94, respectively. The valve tubes 93 and 94 connect at their front ends with actuating rods 95 and 96, respectively, which extend forwardly through a front wall 97 in the casting 58 and have spur gears 98 and 99, respectively, keyed thereto exteriorly of the wall 97. These gears 98 and 99 both mesh with a common gear 100 keyed to a shaft 101 having a control handle 102 on the outer end thereof. A cover member 103 conceals and protects the gears 98, 99 and 100. The rear end of the valve sleeve 92 is closed. The rear end of the valve sleeve 91 communicates with a hose 104 which extends out through an aperture provided therefor in the casting 58 and has a suitable socket connection 105 on the outer end thereof adapted to complete connection to the water faucet. Therefore, when the socket 105 is attached to the faucet and the water is turned on, water under pressure is constantly supplied to the interior of the valve tube 93, from which it is in turn supplied through valve ports next to be described to the chamber 82, the chamber 84 and the soap container 88. Thus the valve sleeve 91 surrounding the valve tube 93 is provided with a port 3 (Figs. 7 and 14) communicating with the chamber 82, a port 2 (Figs. 7, 9 and 13) communicating with the chamber 84 and a port 1 (Figs. 7, 8 and 12) communicating with the soap container 88. The valve tube 93 is in turn provided with ports 3a, 3b, 2a, 2b, and 1' so oriented with respect to the ports 3, 2 and 1 as to communicate therewith in different positions of rotation of the valve tube 93. The port 1' in the valve tube extends an appreciable distance around the tube so that water connection between the tube 93 and the soap container is maintained during a substantial arc of rotation of the valve tube. The ports 2b and 3b, on the other hand, are of substantially the same shape and area as the ports 2 and 3 so that those ports are fully open only in single predetermined positions of the valve tube. The ports 2a and 3a are even smaller than the ports 2 and 3 as their function is to provide a smaller flow of water than that provided by ports 2b and 3b.

The valve sleeve 92 is provided with a port 5 communicating with the chamber 82 (Figs. 7 and 14), a port 4 communicating with the chamber 84 (Figs. 7, 9 and 13) and a port 6 communicating with the soap receptacle 88 (Figs. 7, 8 and 12). The valve tube 94 in turn is provided with ports 5', 4' and 6' for communicating with the sleeve ports 5, 4 and 6, respectively, in certain predetermined positions of operation (Figs. 12, 13 and 14). The port 6' in the valve tube is of substantial circumferential dimensions and so positioned with respect to the ports 4' and 5' as to be open when either of the ports 4' and 5' is open although the ports 4' and 5' are spaced circumferentially with respect to each other so that they are not both open simultaneously.

The various ports in the two valve tubes and the two valve sleeves are so positioned relative to each other that when the valve control handle 102 is rotated to the right to thereby rotate the valve control rods 95 and 96 to the left, four different water connections are created in four different successive positions of the handle 102.

In the first position (Figs. 12, 13 and 14) ports 2b and 3a, 3b and 5' are out of registration with their associated sleeve ports 2, 3 and 5 but the port 1' is in registration with the port 1 to supply water under pressure to the soap receptacle 88, and the port 6' is in registration with the sleeve port 6, which constitutes the outlet port from the soap receptacle 88, so that water is admitted through the soap container from the valve tubing 94, and the port 4' is in registration with the port 4, so that the water supplied through the soap receptacle is admitted through ports 4' and 4 to the chamber 84 and thence through the hub member 85 to the lower spray, from which it is directed upon the dishes. The soap receptacle 88 preferably contains lumps of soap which are gradually dissolved by the water passing therethrough. Furthermore, at the completion of each operation the soap receptacle 88 is left filled with water which dissolves considerable soap so that at the next washing operation there is a relatively strong soap solution ready to be discharged on the dishes.

However, if water were supplied to the spray only through the soap receptacle 88, the soap solution therein would be too quickly exhausted. For this reason, the small port 2a is provided in valve tube 93 to simultaneously admit a reduced flow of clear water into the chamber 84, where it mixes with the soap solution and feeds to the lower spray.

In the second position of the handle 102, the valve tubes 93 and 94 have rotated one-quarter turn to the left from the positions shown in Figs. 12, 13 and 14. The ports 2b and 3b are still out of registration with the ports 2 and 3 but the port 1' is still in registration with the port 1 and the port 6' is in registration with the port 6. Port 4', however, is no longer in communication with ports 4, but port 5' is in communication with port 5 so that the water transmitted through the soap receptacle is now directed into the chamber 82 and thence through the hose 83 and conduit 79 to the cover spray to direct soapy water upon the dishes from above. The soap solution from receptacle 88 is now diluted by clear water entering the chamber 82 through the restricted port 3a, which is in registration with port 3.

In the third position of the handle 102 the valve tubes 93 and 94 have been rotated 180° from the position shown in Figs. 12, 13 and 14, and the port 1' is out of registration with the port 1, and port 6' is out of registration with port 6, thereby cutting off all water flow through the soap container, and port 2b is in registration with port 2, thereby supplying a full flow of clear water directly to the chamber 84 and thence through the hub 85 to the lower spray mechanism. At this time the port 4' is out of registration with the port 4 so that the water cannot escape therethrough into the soap receptacle.

In the fourth position of the handle 102 the valve tubes 93 and 94 have been rotated 270° to the left from the position shown in Figs. 12, 13 and 14, and the ports 1', 6', 4', 2a, 2b and 5' are out of registration with the ports 1, 6, 4, 2 and 5, respectively, but the port 3b is in registration with the port 3, thereby supplying a full flow of water directly to the chamber 82 and thence through the hose connection 83 to the cover spray.

In normal operation it is usually desirable to first pass soapy water through one spray, then through the other spray, and then pass clear water first through one spray and then through the other spray, to rinse the dishes. These different operations can be performed by simply successively moving the valve control handle 102 from the first position consecutively to the second, third, and fourth positions. If a longer period of operation in any position is desired for any purpose, the valve may be left in that position for any desired length of time. Thus, if desired, the use of the soapy water can be eliminated by moving the valve immediately to the third and fourth positions.

Heretofore only four different positions of the control valve have been described, in each of which either clear or soapy water is admitted to either the upper or the lower spray. As shown in Fig. 1, the washer is adapted to be mounted on a sink and connected to the usual water faucet on the sink so that complete shut-off of the water may be controlled by the sink faucet. However, if desired, the water may be shut-off by means of the valve provided on the washer by rotating the handle 102 into an extreme left or counter-clockwise position to thereby displace the valve tubes 93 and 94 slightly to the right or clockwise from their positions shown in Figs. 12, 13 and 14. It will be observed from an inspection of these figures that if the tubes 93 and 94 are shifted to the right through a very small angle, all of the ports in the tubes will be out of registration with their cooperating ports in the sleeves, and no water can flow to either the upper or the lower spray.

*Rotary spray mechanism*

As previously mentioned, the lower rotary spray mechanism in my washer comprises an arm 86 rotatable in a hub 85. Hub 85 extends through the bottom wall of the washer receptacle 56 and is screwed into a recess provided therefor in the casting 58. Arm 86 in turn has secured thereto a downwardly extending hollow shaft 106 which extends within the hub 85 and serves both to rotatably support the arm 86 with respect to the hub and to conduct water to the arm 86 from the chamber 84. The shaft 106 is provided with a thrust nut 107 on its lower end, the upper edge of which is adapted to bear against the lower edge of the hub member 85 and prevent upward movement of the shaft 106.

The arm 86 (Fig. 2) extends beyond the hub 85 in both directions but one end 109 is short and curved and has attached thereto at its outer end a flexible rubber hose 110 which extends to a nozzle mechanism 111 which is slidably mounted on the other or long end 112 of the arm 86. This long end 112 of arm 86 extends radially from the hub 85 to a point proximate the side wall of the receptacle 56.

Referring now to Figs. 20, 21 and 22, which are detailed plan and vertical sectional views of the nozzle 111, it will be observed that this nozzle comprises a hollow body portion 113 having upwardly directed spray holes 114 therein through which water is directed. The body portion 113 of the nozzle is in turn attached to a carriage member 115 which is slidably mounted upon a sleeve 116 which is in turn slidable upon the long end 112 of the arm 86. The carriage member 115 is freely slidable longitudinally on the sleeve 116 and is adapted to be moved back and forth therealong as the arm 86 rotates, to move the spray element 111 back and forth through a spiral path.

To move the spray mechanism 111 radially back and forth along the sleeve 116 as the arm 86 rotates, a spiral track 117 is provided within the receptacle 56 immediately above the arm 86, this spiral track 117 being preferably formed of flat strip metal (Fig. 6) wound in a loose spiral and attached at numerous points to the radial arms 118 which constitutes a supporting frame. Thus each arm 118 is bent downwardly at its outer end and terminates in a rubber shoe 119 which rests upon the floor of the receptacle. Attached to the spray carriage 115 by a screw 120 is a resilient wire frame 121 which supports on its outer end a follower 122 having a groove adapted to receive the lower edge of the spiral track 117. As the arm 86 rotates in one direction, the follower 122 following the track 117 causes the spray mechanism 111 to move outwardly toward the side wall of the receptacle 56 and when the arm 86 rotates in the opposite direction the follower 122 cooperating with the track 117 causes the spray mechanism 111 to move inwardly toward the hub 85.

The arm 86 is rotated by the reaction of water issuing from the spray 111 and from auxiliary jets to be described later. Thus it was previously mentioned that the spray apertures 114 (Fig. 21) project vertically. However, the water from these jets is deflected slightly from the vertical by a deflector 123 which consists of a wedge-shaped member 124 extending longitudinally above the row of spray apertures 114 and supported at opposite ends on arms 125 which extend downwardly and are pivotally supported on the spray body 113 by pins or screws 126. The arms 125 contact the carriage 115 when rotated about the pivots 126, thereby limiting the movement of the wedge deflecting member 124 between two positions in one of which the apex of the wedge is positioned on one side of the spray apertures 114 and in the other position of which the apex of the wedge is positioned on the other side of the apertures 114. Therefore, in one position of the deflector 125 the water is deflected tangentially from the vertical in one direction and in the other position of the deflector 123 the water is directed tangentially from the vertical in the opposite direction. By virtue of the tangential component of the reaction of the water issuing from the spray 111 the arm 86 is caused to rotate in one direction or the other.

In order to reverse the direction of rotation of arm 86 whenever the spray 111 reaches the inner or the outer end of the long end 112 of the arm, a stop member 127 is provided on the track 117 adjacent the outer end thereof and a stop member 128 is provided on the track adjacent its inner end, these stops being so positioned as to lie in the path of a stud 124a projecting upwardly on the wedge member 124 and shift it into the opposite position. Thus it will be observed that the wedge member 124 is always in forward position with reference to the direction of travel at any given instant so that when the wedge member intercepts either stop member it will be reversed into the other position. Of course, the torque applied to the arm 86 by the reaction of the water issuing from the spray mechanism 111 depends upon the distance the spray 111 is from the axis of rotation (the hub 85). Therefore, when the spray mechanism is adjacent the outer end of the arm 86 it produces a strong torque sufficient to rotate the arm 86. However, when the spray mechanism 111 is at the inner end of its travel near the hub 85 the torque will be much less and may not under all conditions be sufficient to reverse the direction of motion of the arm 86.

To insure positive rotation of the arm 86 when the spray 111 is near the inner end of the arm, special jets 129 and 130 are provided in the outer end of the sleeve 116, (Figs. 21 and 22), these jets being directed tangentially in opposite directions and cooperating with a pair of orifices 131 and 132, respectively, in the arm 112, the sleeve 116 being slidable longitudinally along the long end 112 of arm 86 through a short distance and the orifices 131 and 132 being so positioned that when the sleeve 116 is in one extreme position the jet 129 is uncovered but the jet 130 is closed, and when the sleeve is in the other extreme position the jet 130 is uncovered and the jet 129 is closed.

To shift the sleeve 116 from each position to the other at opposite ends of the track 117, the extreme ends of track 117 are deflected sharply in radial directions, the outer end 180 being deflected outwardly, and the inner end 181 inwardly. When the follower 122 on the spray mechanism 111 reaches the outer end 180 of the track 117 it moves the mechanism 111 radially outwardly into contact with a flange 116a on the outer end of sleeve 116 to shift the latter outwardly into the position shown in Fig. 21 in which port 129 is opened. When the follower 122 on the spray mechanism 111 reaches the inner end 181 of track 117, it moves the mechanism 111 radially inwardly into contact with a flange 116b on the inner end of sleeve 116 to shift the latter inwardly into the position shown in Fig. 22, in which port 130 is opened. A pin 112a projects from the long end 112 of arm 86 through a slot 116d in sleeve 116 to prevent rotation of sleeve 116 and limit its longitudinal motion, Fig. 6.

Dish racks

As has been previously indicated, racks are provided within the receptacle 56 above the lower spray mechanism therein for supporting dishes in proper position for washing. Two racks are employed, one for supporting plates and saucers and similar relatively flat dishes, and the other for supporting small irregularly shaped articles such as knives, forks and spoons. It is intended that only one of these racks be employed at a time. The plate rack will first be described.

Referring to Figs. 16, 17, 18 and 19, the plate rack comprises a base frame adapted to rest upon the spiral track 117 and consisting of three substantially semi-circular frame elements 135, 136 and 137, all interconnected at their ends to a diametrical member 138. As shown in Fig. 16, the diametrical member 138 and the outer arcuate member 137 are made integral with each other and the ends of the inner arcuate members 135 and 136 are welded or otherwise secured to the diametrical member 138. The inner arcuate members 135 and 136 are preferably notched, as indicated at 139, so that they support the lower edges of plates resting thereon without slipping. The plates are maintained in "on edge" position, substantially vertically disposed, by spoke members 140 which radiate from a hub 141 mounted upon the diametrical frame member 138. As shown to best advantage in Fig. 17, each spoke member 140, when in position for use, extends upwardly and outwardly at a steep angle from the hub 141, thence outwardly and then downwardly to the outer arcuate member 137. The spoke members are made of wire and are pivotally supported at their outer ends by being extended through apertures in a flange member 142 secured to the inner edge of the member 137 and extending slightly thereabove. The outer ends of the spoke members 140 are bent laterally beyond the flange member 142 so that when the spoke members are in vertical position the laterally extended ends rest upon the top of the arcuate member 137 and prevent rotation of the spoke members in one direction.

At the inner or hub ends the spoke members are pivotally secured to the hub member 141 in a special manner to impart to the spoke members the property of tending to resiliently maintain themselves in upwardly or vertical position. Thus the spokes 140 are subdivided into groups of threes identified by the brackets 143, 144, 145, 146 and 147. The center spoke of each of these groups has its inner end 149 bent inwardly and projects into an aperture provided therefore in the hub members 141. The two outer spokes of each group of three spokes are formed integrally from a single piece of wire, the free ends of which constitute the outer ends of the spokes, the inner ends of the two spokes being bent around and pivotally supported on the inner end 149 of the associated middle spoke. The outer spokes extend nearly vertically from their pivotal connection on the end 149 of the middle spoke on opposite sides of the middle spoke and the latter is provided with a bend 151 therein which engages against the outer spokes and forces all three spokes of the group to assume predetermined spaced apart positions.

The construction of the outer spokes of each group of three spokes from a single piece of wire produces a resilient structure which tends to remain in upper or open position. Thus the movement of any one of the group of three spokes about the inner end 149 of the central spoke as an axis forces the inner substantially vertical portions of the outer spokes to bend at different angles by virtue of the fact that their outer ends are supported at spaced apart points. This resilience is desired because it forces the operator to place the plates in the rack in such way as to lean the plates against the spoke members 140 in such direction as to urge the outer ends of the spoke members down against the arcuate frame member 137, thereby maintaining the rack in open position. If the operator erroneously attempts to insert the plates in the rack in such way as to incline against the spoke members 140 in the wrong direction, then the weight of the plates simply collapses the rack and the operator is immediately apprised of the mistake.

To conserve space when the washing machine is not in use, the plate supporting rack can be collapsed by folding all the spokes 140 down against the frame members 135, 136 and 137. To facilitate collapse of the spoke members, a cam mechanism is provided on the central hub 141, this cam member consisting of a substantially semi-circular flange 152 pivotally supported on the hub member 141. Thus referring to Fig. 19, the hub member 141 itself may be attached to a plate 153 by screws 154 which extend up through the hub member 141 and thread into a cap member 155, the plate 153 in turn being welded or otherwise secured to the diametrical frame member 138. The cam member 152 then rests upon the cap member 155 and is pivotally retained in position by a rotatable washer member 162, which is in turn pivotally secured to the hub member 141 by a pivot screw 156. To rotate the cam 152, a handle 157 is provided on the washer member 162, this handle consisting of a doubled back wire member having its free ends projecting diametrically in opposite directions into recesses provided therefor in ears 158 extending from the upper surface of the washer member 162. Cam member 152 is provided with a pair of pin members 159 and 160, either of which may be engaged between the two arms of the handle 157.

As shown in Fig. 16, the rack is in open position and the cam 152 is turned in such position as to clear all of the spokes. To collapse the spokes, the handle 157 is lifted and rotated into position above the pin 159 and then lowered into engagement with the pin. Thereafter the handle 157 is moved in clockwise direction, rotating the cam 152 with it in clockwise direction and the leading end of the cam successively contacts the inner, substantially vertical portions of the spoke members 140 and forces the spokes into flat position down against the arcuate frame members 135, 136 and 137. To release the spokes the rotation of the cam 152 is resumed to bring it back into its original position as shown in Fig. 16, the spokes rising back of the cam as the latter releases them.

It will be observed from Fig. 16 that the hub member 141 is positioned eccentrically with respect to the arcuate members 135, 136 and 137 and that the three arcuate rings are likewise disposed in eccentric relation with respect to each other. This is to provide greater radial distance between the hub 141 and the outer arcuate member 137 at one end of the rack than the other, whereby one end of the rack accommodates large platters and the other end of the rack accommodates small saucers, dessert dishes, etc.

When it is desired to wash small articles such as knives, forks and spoons, the plate rack just described is lifted out of the receptacle 56 and a special closed tray 170 (Fig. 3) is inserted in the machine. This tray 170 consists of a base member 171 and a cover member 172, both of which may be constructed of wire screen or other perforate material. The two members are substantially identical in shape, each having a flat face of substantial area, a full end wall at one end but no end wall at the other and having triangular side walls sloping from the full end wall at one end to a point adjacent the flat face at the other end. The base member 171 has a supporting bracket 173 extending therealong from one end to the other, which supporting bracket is provided at one end with a projecting button or shaft 173a at one end adapted to be received in an aperture in a collapsible support 174, which is hingedly attached to the spiral track 117. When the tray 170 is not in use, the bracket 174 is simply folded down on top of the track 117 so that it does not interfere with the plate rack just described. The opposite end of the bracket 173 extends up along the other end of the lower member 171 and is looped inwardly, then outwardly and downwardly, and provided with a slot 175 in its outer end which is adapted to be received by the flattened end 176 of a shaft 177 which is rotatably mounted in the wall of the receptacle 56 and extends therethrough and is provided with a knob 178 on its outer end. At the inner end of the bracket 173 a second spring member 179 is provided for resiliently retaining the cover member 172 of the tray in position at that end.

By constructing the upper and lower tray members with triangular sides as described, a structure results which is peculiarly adapted for the ready removal of articles therefrom. Thus articles such as knives, forks and spoons can be readily dislodged from either tray by simply sliding the articles out of the open end of the tray.

The support 174 and the shaft 177 are so positioned as to support the receptacle 170 in the path of the spray issuing from the upper spray jets 78. During the washing operation while water is projected from the jets 78 onto the receptacle 170 the latter may be rotated by turning the knob 178 to shift the articles in the receptacle around into different positions and expose all faces of the articles to the water spray.

Although the invention has been explained by describing a particular embodiment thereof in detail, it is to be understood that various obvious departures from the structure described may be made without departing from the invention and the latter is to be limited only as set forth in the appended claims.

I claim:

1. In a dishwashing machine, a lower receptacle of approximately cylindrical shape; a cover therefor of dome shape adapted to seal at its lower edge with the upper edge of the lower receptacle in a normal position and adapted to nest within the lower receptacle in an inverted position; connecting means between said lower receptacle and cover comprising a supporting member and means hingedly connecting it to said lower receptacle for swinging movement about a horizontal axis substantially tangential to said receptacle, and a swivel joint structure interconnecting said supporting member to said cover and comprising two members relatively rotatable about an axis extending substantially diametrically with respect to said cover, one of said swivel members being secured to said cover and the other being secured to said supporting member; whereby said cover may be swung from open to closed position, with respect to said receptacle, with said supporting member, and may be rotated on said swivel joint structure while in open position either into position to effect normal closure of said lower receptacle or into position for nesting within said lower receptacle when subsequently swung toward said receptacle on said supporting member.

2. A dishwashing machine as described in claim 1, in which said swivel joint structure includes spring detent means for yieldably retaining said two swivel members in that position in which said cover is aligned for seating engagement with said receptacle.

3. A dishwashing machine as described in claim 1, including a spray nozzle in said cover, a water supply conduit on said receptacle, means for completing water connection between said conduit and nozzle comprising a first coupling member on said receptacle connected to said conduit and a second coupling member on said cover so positioned thereon as to abut against and make water-connection with said first coupling member when said cover is moved into closed position, and spring detent means on said swivel joint structure for yieldably retaining the two members of said swivel in that position in which said cover is aligned for seating engagement with said receptacle and said coupling members are aligned for water connection.

4. A dishwasher comprising a receptacle for containing dishes and a lower spray means in said receptacle for projecting water upwardly on dishes therein, an upper spray means in said receptacle for projecting water downwardly on dishes therein, a water-tight container for soap, having inlet and outlet ports, conduit means for supplying water under pressure, and control means for selectively connecting said conduit means either directly to either spray means, or indirectly to either spray means through said soap container, said control means comprising a first valve associated with said water supply conduit and operable into a plurality of predetermined positions for selectively connecting said conduit either to said lower spray, to said top spray, or to the soap container inlet port, a second valve operable into a plurality of predetermined positions for selectively connecting the outlet port of said soap container either to said lower spray, or to said upper spray, or to close said outlet port, an actuating means movable progressively through first, second, third and fourth positions, respectively, for operating said two valves in unison in such order that: in said first position said conduit is connected to said inlet port and said outlet port is connected to one of said sprays, in said second position said conduit is connected to said inlet port and said outlet port is connected to the other of said sprays, in said third position said conduit is connected directly to one of said sprays and in said fourth position said conduit is connected directly to the other of said sprays.

5. A dishwasher comprising a receptacle, a rack in said receptacle for supporting dishes above the bottom of said receptacle, and rotary spray means in said receptacle below said rack for directing water upwardly onto dishes in said rack, said rotary spray means comprising an arm, means rotatably supporting said arm for free rotation below said rack, nozzle means slidable along said arm and conduit means for supplying water to said nozzle means, a spiral track adjacent said arm and extending continuously in a plurality of laps between end points adjacent the center of rotation of said arm and adjacent the path of rotation of the end of said arm, respectively, guide means on said nozzle means for slidably engaging said track, and means for alternately rotating said arm in opposite directions whereby said nozzle moves back and forth through a spiral path, extending from end to end of said spiral track.

6. A dishwasher comprising a receptacle, a rack in said receptacle for supporting dishes above the bottom of said receptacle, and rotary spray means in said receptacle below said rack for directing water upwardly onto dishes in said rack, said rotary spray means comprising an arm, means rotatably supporting said arm for free rotation below said rack, nozzle means slidable along said arm and conduit means for supplying water to said nozzle means, a spiral track adjacent said arm, guide means on said nozzle means for slidably engaging said track, auxiliary nozzle means on said arm defining a pair of orifices facing in the two opposite directions of movement of the arm whereby the reaction of the water jet from one orifice tends to rotate the arm in one direction and the reaction of the water jet from the other orifice tends to rotate the arm in the other direction, and means for opening one of said orifices and closing the other in response to arrival of said nozzle at the inner end of said spiral track, and opening the other orifice and closing the said one orifice in response to arrival of the nozzle means at the outer end of said spiral track.

7. A dishwasher comprising a receptacle, a rack in said receptacle for supporting dishes above the bottom of said receptacle, and rotary spray means in said receptacle below said rack for directing water upwardly onto dishes in said rack, said rotary spray means comprising an arm, means rotatably supporting said arm for free rotation below said rack, nozzle means slidable along said arm, and conduit means for supplying water to said nozzle means, a spiral track adjacent said arm, guide means on said nozzle means for slidably engaging said track, said nozzle means being adjustable to deflect water issuing therefrom upwardly and tangentially in either tangential direction, and separate means at opposite ends of said spiral track responsive to movement of said nozzle means to each end of said spiral track for reversing the tangential direction of water issuing from said nozzle means.

8. A dishwasher comprising, in combination, a receptacle, reversible cover means adapted to extend upwardly from the edge of said receptacle in a washing position and to nest within the upper portion of said receptacle in position of disuse, spray means in the lower portion of said receptacle for projecting a water spray upwardly therein, and a collapsible plate rack in said receptacle above said spray means, said rack comprising stationary frame means for supporting the lower edges of plates positioned vertically thereabove, and plate separating and supporting arms pivotally supported on said frame for movement from upper active positions spaced from each other into inactive positions resting flat on said frame below said cover means when the latter is nested within said receptacle.

9. In a dishwasher of the class comprising a receptacle, spray means in the lower portion of said receptacle for projecting a water spray upwardly therein, and a plate rack in said receptacle above said spray means, the plate rack construction comprising stationary frame means for supporting the lower edges of plates positioned vertically thereabove, plate separating and supporting arms pivotally supported on said frame for movement from upstanding positions spaced from each other into positions resting flat on said frame, and means for constantly urging said arms into upper position but yieldable to permit movement of the arms into lower position.

10. A plate rack construction as described in claim 9 in which said frame comprises a hub member and an arcuate member spaced therefrom and said arms are divided into groups of threes, each arm being of approximate inverted U-shape and pivotally supported on its outer end on said arcuate member, the two outer arms of each group being integrally secured together at their inner ends and pivotally supported on the inner end of the intermediate arm of said group.

11. A plate rack construction as described in claim 9 in which said frame comprises a hub member and an arcuate member spaced therefrom and said arms are divided into groups of threes, each arm being of approximate inverted U-shape and pivotally supported on its outer end on said arcuate member, the two outer arms of each group being integrally secured together at their inner ends and pivotally supported on the inner end of the intermediate arm of said group, and rotatable means on said hub member for collapsing said arms flat against said frame.

12. In a dishwashing machine of the class comprising a receptacle, rotatable spray means in the lower portion of said receptacle and a plate rack in said receptacle above said spray means for retaining plates positioned on edge at a predetermined direction of inclination to the vertical, the plate rack construction comprising an arcuate horizontal frame member and a hub member eccentrically positioned with respect to said arcuate member, a plurality of spoke members extending from said hub member to said arcuate member, each of said spoke members being pivotally supported at its inner end on said hub member, said spoke members being rotatable in one direction from approximately vertical positions into lower position substantially flat on the plane of said hub and arcuate member, means for preventing rotation of said spoke members from the vertical in the other direction, and means for yieldably urging said spokes into vertical position whereby plates positioned between and leaned against said spokes in one direction retain the spokes in vertical position and when leaned against the spokes in the other direction collapse the spokes.

13. A dishwasher comprising a receptacle, rotary spray means in the bottom of said receptacle, said spray means comprising an arm, means rotatably supporting said arm for free rotation, nozzle means slidable along said arm and conduit means for supplying water to said nozzle means, a spiral track positioned horizontally above said arm, guide means on said nozzle means for slidably engaging said track, and means for alternately rotating said arm in opposite directions whereby said nozzle moves back and forth through a spiral path, said spiral track constituting a rack for supporting dishes to be washed above said spray means.

14. A dishwasher as described in claim 8 with means for constantly urging said arms into their upper positions but yieldable to permit movement of the arms into said inactive positions.

JAMES B. FULLERTON.